(12) United States Patent
Tsugami et al.

(10) Patent No.: US 12,452,180 B2
(45) Date of Patent: Oct. 21, 2025

(54) SYSTEM, METHOD AND PROGRAM FOR COLLECTING DATA

(71) Applicant: NTT, Inc., Tokyo (JP)

(72) Inventors: Ryohei Tsugami, Musashino (JP); Tatsuya Fukui, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/579,918

(22) PCT Filed: Aug. 2, 2021

(86) PCT No.: PCT/JP2021/028660
§ 371 (c)(1),
(2) Date: Jan. 17, 2024

(87) PCT Pub. No.: WO2023/012878
PCT Pub. Date: Feb. 9, 2023

(65) Prior Publication Data
US 2024/0356855 A1    Oct. 24, 2024

(51) Int. Cl.
| H04L 29/06 | (2006.01) |
| H04L 12/24 | (2006.01) |
| H04L 12/26 | (2006.01) |
| H04L 29/08 | (2006.01) |
| H04L 45/00 | (2022.01) |
| H04L 47/20 | (2022.01) |

(52) U.S. Cl.
CPC ............. *H04L 47/20* (2013.01); *H04L 45/70* (2013.01)

(58) Field of Classification Search
CPC ......... H04L 47/20; H04L 45/70; H04L 29/06; H04L 29/08; H04L 12/24; H04L 12/26; H04L 12/801

USPC .......................................................... 709/223
See application file for complete search history.

(56) References Cited

U.S. PATENT DOCUMENTS

| 6,671,760 B1 * | 12/2003 | Kawasaki | H04J 3/1611 710/316 |
| 6,886,044 B1 * | 4/2005 | Miles | G06Q 30/06 709/227 |
| 10,644,988 B2 * | 5/2020 | Tanaka | H04L 45/124 |
(Continued)

OTHER PUBLICATIONS

Tsuchiya, "Ultra-low latency with 100Gbps out of TCP/IP with one wavelength per person," Nikkei Electronics, Feb. 2021, 40-47, 17 pages (with machine translation).

*Primary Examiner* — Jude Jean Gilles
(74) *Attorney, Agent, or Firm* — Fish & Richardson P.C.

(57) ABSTRACT

An object of the present disclosure is to provide a system that does not require a large amount of network resources even in a case where data is collected from a large number of data sources. The present disclosure provides a system that collects data from a plurality of data sources to a server, wherein each of the data sources sends data transfer requirements to a controller, the controller determines a transmission policy of each of the data sources on the basis of the data transfer requirements, each of the data sources autonomously sends a request for generating a communication path on the basis of the transmission policy, the controller generates a communication path on the basis of the request for generating a communication path from each of the data sources, and each of the data sources transmits data by use of the generated communication path.

5 Claims, 14 Drawing Sheets

(56) References Cited

U.S. PATENT DOCUMENTS

| | | | |
|---|---|---|---|
| 11,765,016 B2* | 9/2023 | Park | H04L 12/40013 |
| | | | 370/216 |
| 2019/0166042 A1* | 5/2019 | Hu | H04L 45/42 |
| 2021/0006324 A1* | 1/2021 | Wong | H04B 17/101 |

* cited by examiner

Fig. 5

REQUIREMENT TABLE

DATA SOURCE A

| APPLICATION A | ALLOWABLE DELAY TIME | DATA GENERATION FREQUENCY | DATA GENERATION AMOUNT |
|---|---|---|---|
| | DELAY OF 100ms OR LESS | 10 TIMES/s | 1Gbps |

DATA SOURCE B

| APPLICATION B | ALLOWABLE DELAY TIME | DATA GENERATION FREQUENCY | DATA GENERATION AMOUNT |
|---|---|---|---|
| | DELAY OF 10ms OR LESS | 10 TIMES/s | 100Mbps |

DATA SOURCE C

| APPLICATION C | ALLOWABLE DELAY TIME | DATA GENERATION FREQUENCY | DATA GENERATION AMOUNT |
|---|---|---|---|
| | DELAY OF 10ms OR LESS | 60 TIMES/s | 400Mbps |

Fig. 9

TRANSMISSION POLICY TABLE

DATA SOURCE A

| | TRANSMISSION POLICY (PATH GENERATION TIMING) | TRANSMISSION POLICY (PATH RELEASE TIMING) |
|---|---|---|
| APPLICATION A | AFTER CERTAIN AMOUNT OF DATA IS STORED | AFTER DATA TRANSMISSION IS COMPLETED |

DATA SOURCE B

| | TRANSMISSION POLICY (PATH GENERATION TIMING) | TRANSMISSION POLICY (PATH RELEASE TIMING) |
|---|---|---|
| APPLICATION B | IMMEDIATELY AFTER DATA GENERATION | AFTER DATA TRANSMISSION IS COMPLETED |

DATA SOURCE C

| | TRANSMISSION POLICY (PATH GENERATION TIMING) | TRANSMISSION POLICY (PATH RELEASE TIMING) |
|---|---|---|
| APPLICATION C | IMMEDIATELY AFTER DATA GENERATION | PATH IS RELEASED IF NO DATA IS GENERATED FOR CERTAIN PERIOD OF TIME |

Fig. 11

PATH SETTING LOCATION TABLE

|  | NETWORK DEVICE TO BE SET ||
| --- | --- | --- |
| DATA SOURCE A | NETWORK DEVICE A: CONNECTION | NETWORK DEVICE B: CONNECTION |
| DATA SOURCE B | NETWORK DEVICE A: RELEASE | NETWORK DEVICE C: RELEASE |
| DATA SOURCE C | NETWORK DEVICE D: RELEASE | NETWORK DEVICE E: RELEASE |

SYSTEM, METHOD AND PROGRAM FOR COLLECTING DATA

CROSS-REFERENCE TO RELATED APPLICATIONS

This application is a National Stage application under 35 U.S.C. § 371 of International Application No. PCT/JP2021/028660, having an International Filing Date of Aug. 2, 2021, the disclosure of which is considered part of the disclosure of this application, and is incorporated by reference in its entirety into this application.

TECHNICAL FIELD

The present disclosure relates to communication control for data collection.

BACKGROUND ART

User terminals, sensors, and in-vehicle systems are developed, and the number of sensors and the amount of data generated from each sensor are greatly increased. When the data is collected in a conventional communication method, there is a possibility that processing of communication on the reception side may be a bottleneck.

As a high-speed data transfer method, remote direct memory access (RDMA) has been studied. In RDMA, data is transferred by DMA from a memory of a local computer to a memory of a different remote computer (data is directly transferred between, for example, a peripheral device and a main memory (RAM) without passing through a CPU). For this reason, RDMA does not require CPU processing for data transfer, and thus the bottleneck on the reception side can be avoided.

A remote transfer technique using this RDMA has been proposed (see, for example, Non Patent Literature 1). However, in Non Patent Literature 1, in order to transfer data by RDMA in a wide area communication network, it is necessary to set a communication path for each flow in advance. Therefore, in a case where data is collected from a large number of data sources, a large amount of network resources are required.

CITATION LIST

Non Patent Literature

Non Patent Literature 1: "Hitori ichi-hachou" de 100 Gbps datsu TCP/IP de chou-teichien (100 Gbps by "1 person 1 wavelength", ultra-low delay by de-TCP/IP), Nikkei Electronics, 2021 March, P40-47

SUMMARY OF INVENTION

Technical Problem

An object of the present disclosure is to provide a system that does not require a large amount of network resources even in a case where data is collected from a large number of data sources.

Solution to Problem

A system and method of the present disclosure are a system that collects data from a plurality of data sources to a server, and a method in the system, wherein the system includes a controller that determines transmission policies to be distributed to the plurality of data sources, each of the data sources sends, to the controller, data transfer requirements when data is sent to the server, the controller determines a transmission policy of each of the data sources on the basis of the data transfer requirements, each of the data sources autonomously transmits a request for generating a communication path on the basis of the transmission policy, the controller generates a communication path from each of the data sources to the server on the basis of the request for generating a communication path from each of the data sources, and each of the data sources transmits data by use of the generated communication path.

Each of the devices such as the controller and the data sources of the present disclosure can also be implemented by a computer and a program, and the program can be recorded in a recording medium or provided through a communication network. A program of the present disclosure is a program for causing a computer to be implemented as each functional unit included in the devices according to the present disclosure, and is a program for causing a computer to execute each step included in a method to be executed by the devices according to the present disclosure.

Advantageous Effects of Invention

According to the present disclosure, it is possible to provide a system that does not require a large amount of network resources even in a case where data is collected from a large number of data sources.

BRIEF DESCRIPTION OF DRAWINGS

FIG. 5 illustrates an example of information stored in a requirement table of each data source.

FIG. 9 illustrates an example of information stored in a transmission policy table.

FIG. 11 illustrates an example of a path setting location table.

DESCRIPTION OF EMBODIMENTS

Hereinafter, an embodiment of the present disclosure will be described in detail with reference to the drawings. Note that the present disclosure is not limited to the embodiment described below. These embodiments are merely examples, and the present disclosure can be carried out in a form with various modifications and improvements based on the knowledge of those skilled in the art. Note that components having the same reference signs in the present specification and the drawings indicate the same components.

Outline of Present Disclosure

Figure 1:
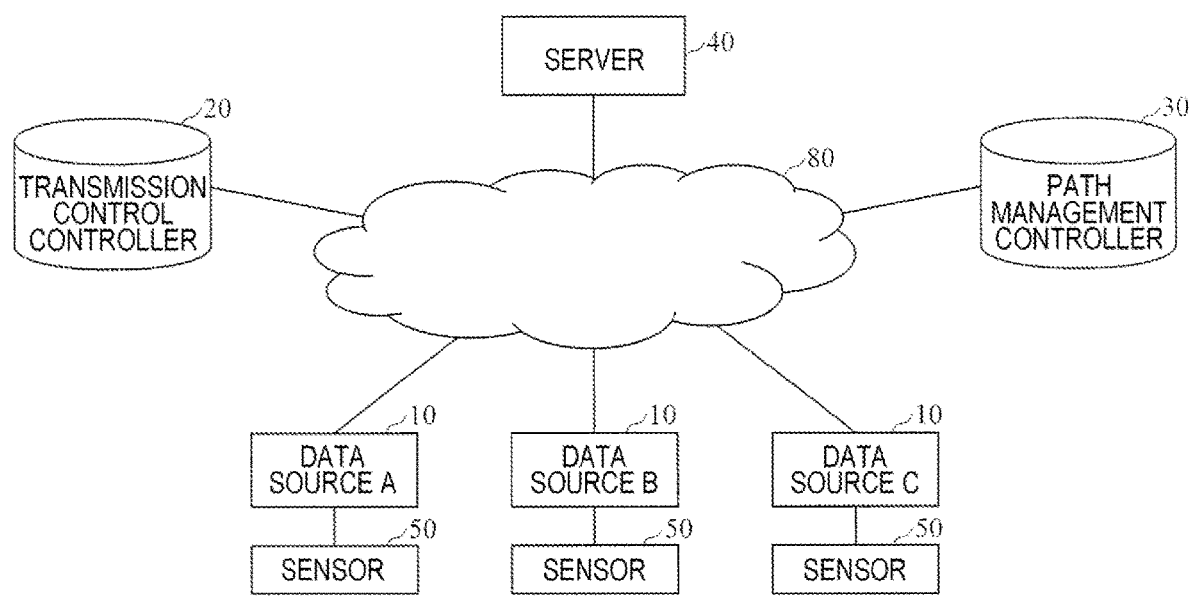
FIG. 1 illustrates a system configuration example of the present disclosure.

FIG. 1 illustrates a system configuration example of the present disclosure. A system of the present disclosure includes a plurality of data sources 10, a transmission control controller 20, a path management controller 30, and a server 40. The plurality of data sources 10, the transmission control controller 20, the path management controller 30, and the server 40 are connected by a communication network 80. Each of the data sources 10 is a terminal having sensing data on the user side. The server 40 is a terminal that collects data from the data sources.

In the present embodiment, an example is shown in which the transmission control controller 20 and the path management controller 30 are separately arranged, but these controllers may be provided in a common device or may be configured by a plurality of devices arranged in a distributed manner. Each device of the present invention can also be implemented by a computer and a program, and the program can be recorded in a recording medium or provided through a communication network.

Figure 2:
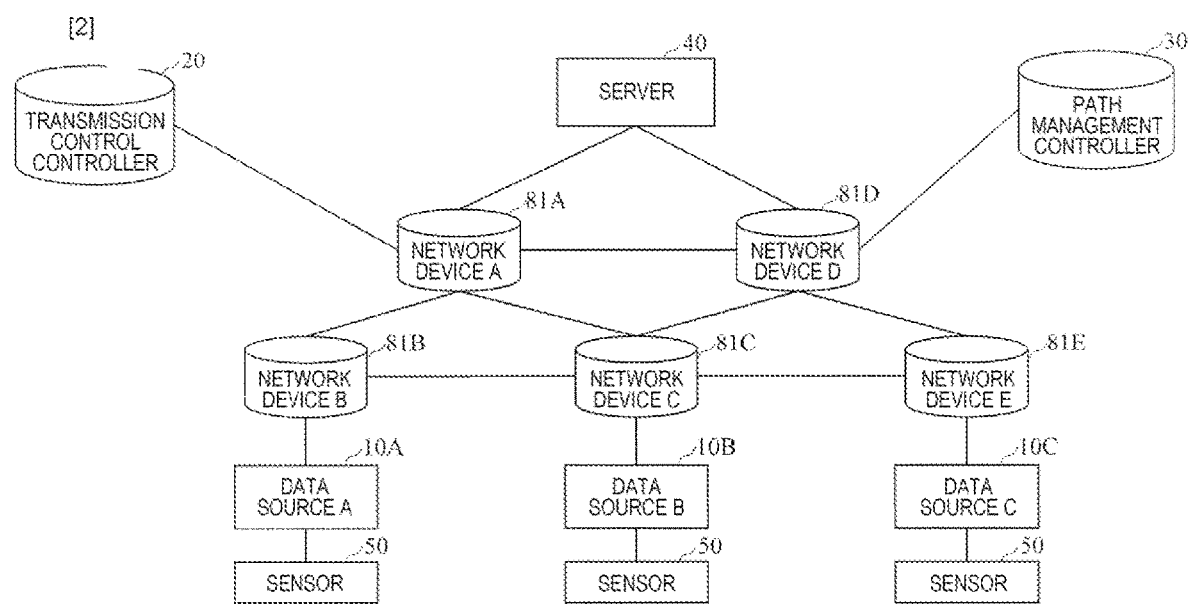
FIG. 2 illustrates a configuration example of a communication network.

FIG. 2 illustrates a configuration example of the communication network 80. The communication network 80 includes a plurality of network devices 81. In the present embodiment, the network devices 81 used between the data sources 10 and the server 40 is determined in advance. For example, a data source 10A and the server 40 are connected by network devices 81A and 81B, a data source 10B and the server 40 are connected by network devices 81A and 81C, and a data source 10C and the server 40 are connected by network devices 81D and 81E.

Each of the network devices 81A to 81E knows to which network device the data addressed to the server 40 should be transferred when the data is received from the data sources 10A to 10C. Therefore, even if it is unknown which of the network devices 81 is to be used, the data sources 10A to 10C specify the server 40 and transmit data, whereby the data is transmitted to the server 40. Accordingly, the present disclosure can transfer data in a lossless and broadband manner when a communication path is generated.

The present disclosure proposes a method of allocating a lossless and broadband communication path to one of the data sources 10, which requires the communication path, at a necessary timing in order to implement data transfer by RDMA.

The system of the present disclosure
   sends data transfer requirements from the data sources 10 to the transmission control controller 20,
   the transmission control controller 20 that has received the data transfer requirements determines a transmission policy for each of the data sources 10 and distributes the transmission policies to the data sources 10,
   each of the data sources 10 autonomously requests, on the basis of the transmission policy, the path management controller 30 to generate a communication path, and
   each of the data sources 10 transmits sensing data to the server 40 after the communication path is established.

Examples of the transmission policies include the following transmission policies.

First transmission policy: A communication path is generated immediately after generation of data, the data is transferred, and the communication path is released immediately after completion of the data transfer.

Second transmission policy: A communication path is generated after a certain amount of data is accumulated, the data is transferred, and the communication path is released immediately after completion of the data transfer.

Third transmission policy: A communication path is generated immediately after generation of data, the data is transferred, and the communication path is held for a certain period of time after completion of the data transfer.

In the present embodiment, the transmission control controller 20 is provided, so that transmission policies that matches data transfer requirements of the data sources 10 are distributed. Each of the data sources 10 then notifies the path management controller 30 of a request for generating or releasing a path in accordance with the transmission policy in consideration of the sensor characteristics and the data transfer requirements for each application, and performs timing control of generation or release of a path. As a result, the present embodiment controls the trade-off between immediacy of data transmission and reduction in communication path usage time. Details will be described below.

Figure 3:
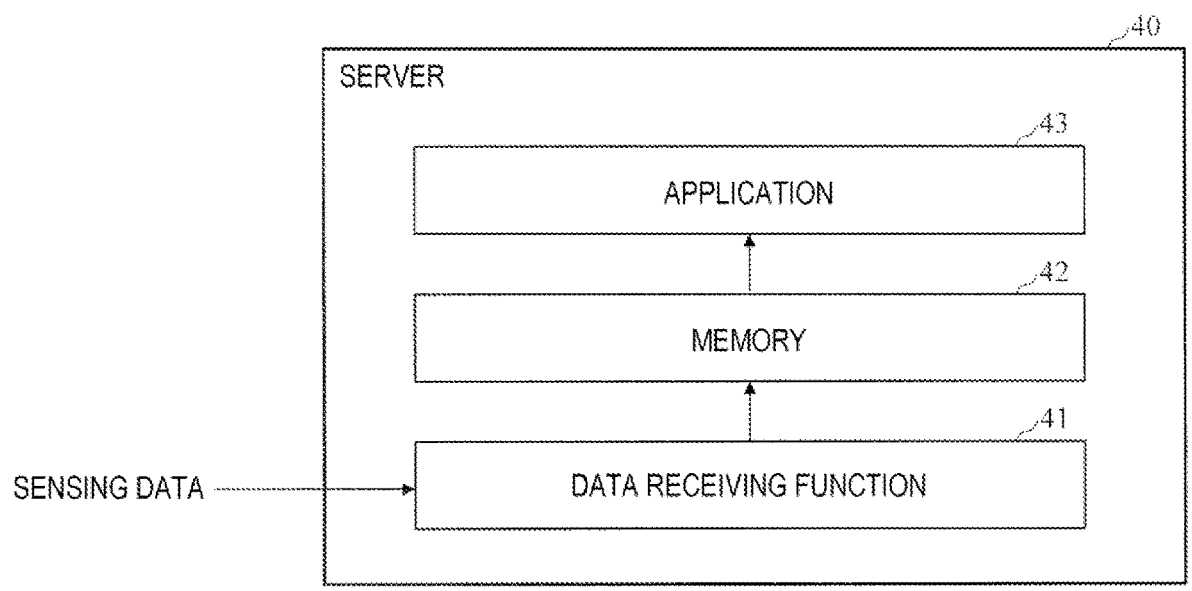
FIG. 3 illustrates a configuration example of a server.

FIG. 3 illustrates a configuration example of the server 40. The server 40 includes a data receiving function 41, a memory 42, and an application 43.

The data receiving function 41 receives sensing data from each of the data sources 10.

The memory 42 stores sensing data from sensors 50.

The application 43 collects sensing data from the sensors 50. The application 43 is any application that collects any sensing data detected or generated by user terminals, sensors, in-vehicle systems, or the like.

Figure 4:
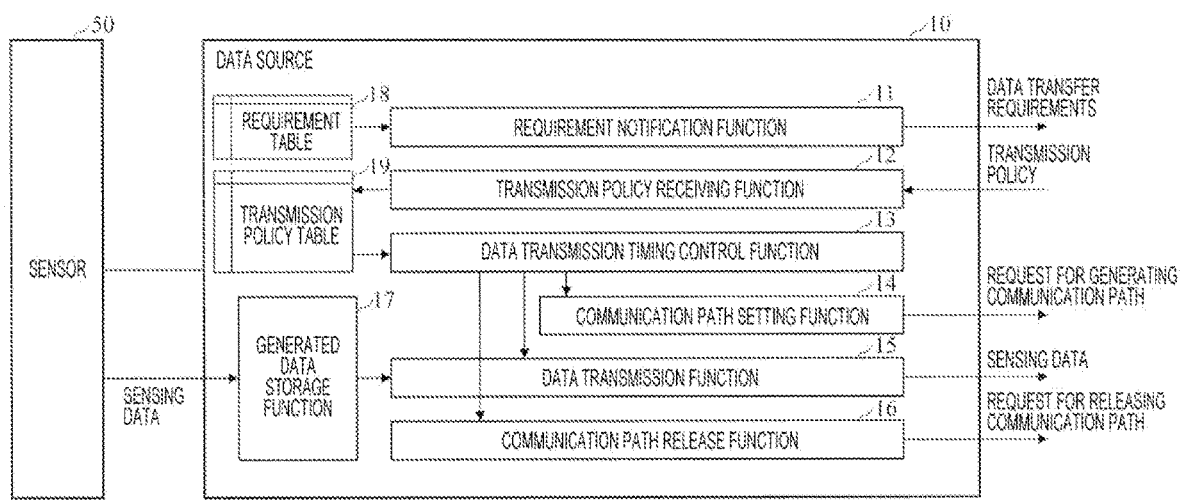
FIG. 4 illustrates a configuration example of a data source.

FIG. 4 illustrates a configuration example of one of the data sources 10. The data source 10 includes a requirement notification function 11, a transmission policy receiving function 12, a data transmission timing control function 13, a communication path setting function 14, a data transmission function 15, a communication path release function 16, a generated data storage function 17, a requirement table 18, and a transmission policy table 19.

The generated data storage function 17 stores sensing data from a corresponding one of the sensors 50.

The requirement notification function 11 reads data transfer requirements from the requirement table 18 and notifies the transmission control controller 20 of the read data transfer requirements.

The transmission policy receiving function 12 receives a transmission policy from the transmission control controller 20.

The data transmission timing control function 13 controls the communication path setting function 14, the data transmission function 15, and the communication path release function 16 in accordance with the transmission policy table 19.

The communication path setting function 14 transmits a request for generating a path to the path management controller 30.

The data transmission function 15 transmits the sensing data stored in the generated data storage function 17 to the server 40.

The communication path release function 16 transmits a request for releasing a path to the path management controller 30.

The requirement table 18 stores data transfer requirements for each of the data sources 10.

The transmission policy table 19 stores a policy when sensing data is transmitted from the data source 10 to the server 40.

FIG. 5 illustrates an example of information stored in the requirement table 18 of each data source. Each requirement table stores, as data transfer requirements, an allowable delay time, a data generation frequency, and a data generation amount of a corresponding one of the data sources 10 in association with an application. The allowable delay time is an allowable delay time from generation of data to arrival at the server. The data generation amount is an amount of data generated at a time in a corresponding one of the sensors 50.

Figure 6:
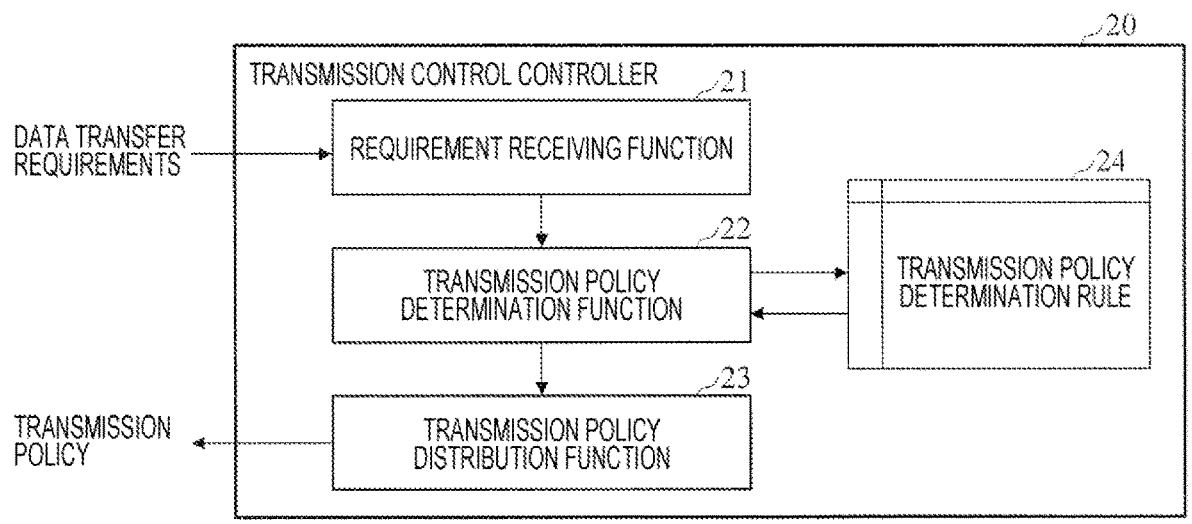
FIG. 6 illustrates a configuration example of a transmission control controller.

FIG. 6 illustrates a configuration example of the transmission control controller 20. The transmission control controller 20 includes a requirement receiving function 21, a transmission policy determination function 22, a transmission policy distribution function 23, and a transmission policy determination rule 24.

Figure 7:
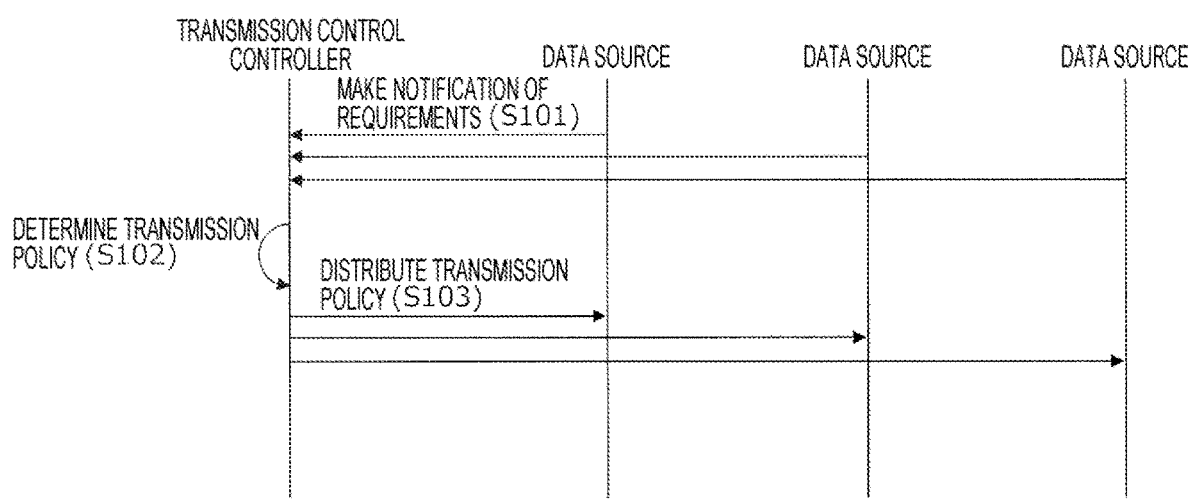
FIG. 7 illustrates an example of an operation in the transmission control controller.

FIG. 7 illustrates an example of an operation in the transmission control controller 20.

Each of the data sources 10 notifies the transmission control controller 20 of data transfer requirements on the basis of information of the requirement table 18. The data transfer requirements include the allowable delay time and the data generation frequency of each of the data sources 10 as illustrated in FIG. 5.

The requirement receiving function 21 of the transmission control controller 20 receives the data transfer requirements from the data sources 10. The transmission policy determination function 22 determines a transmission policy for each of the data sources 10 in accordance with the data transfer requirements in accordance with the transmission policy determination rule 24.

The transmission policy distribution function 23 of the transmission control controller 20 distributes the determined transmission policies to the data sources 10.

The transmission policy determination rule 24 determines a transmission policy according to data transfer requirements for each of the data sources 10 and each application. For example, the transmission policies can be exemplified as follows.

(i) In a case where the allowable delay time is equal to or less than a set time and the data generation frequency is equal to or less than a set value, the foregoing first transmission policy is determined.

(ii) In a case where the allowable delay time exceeds the set time and the data generation frequency is equal to or less than the set value, the foregoing second transmission policy is determined.

(iii) In a case where the allowable delay time is equal to or less than the set time and the data generation frequency exceeds the set value, the foregoing third transmission policy is determined.

Figure 8:
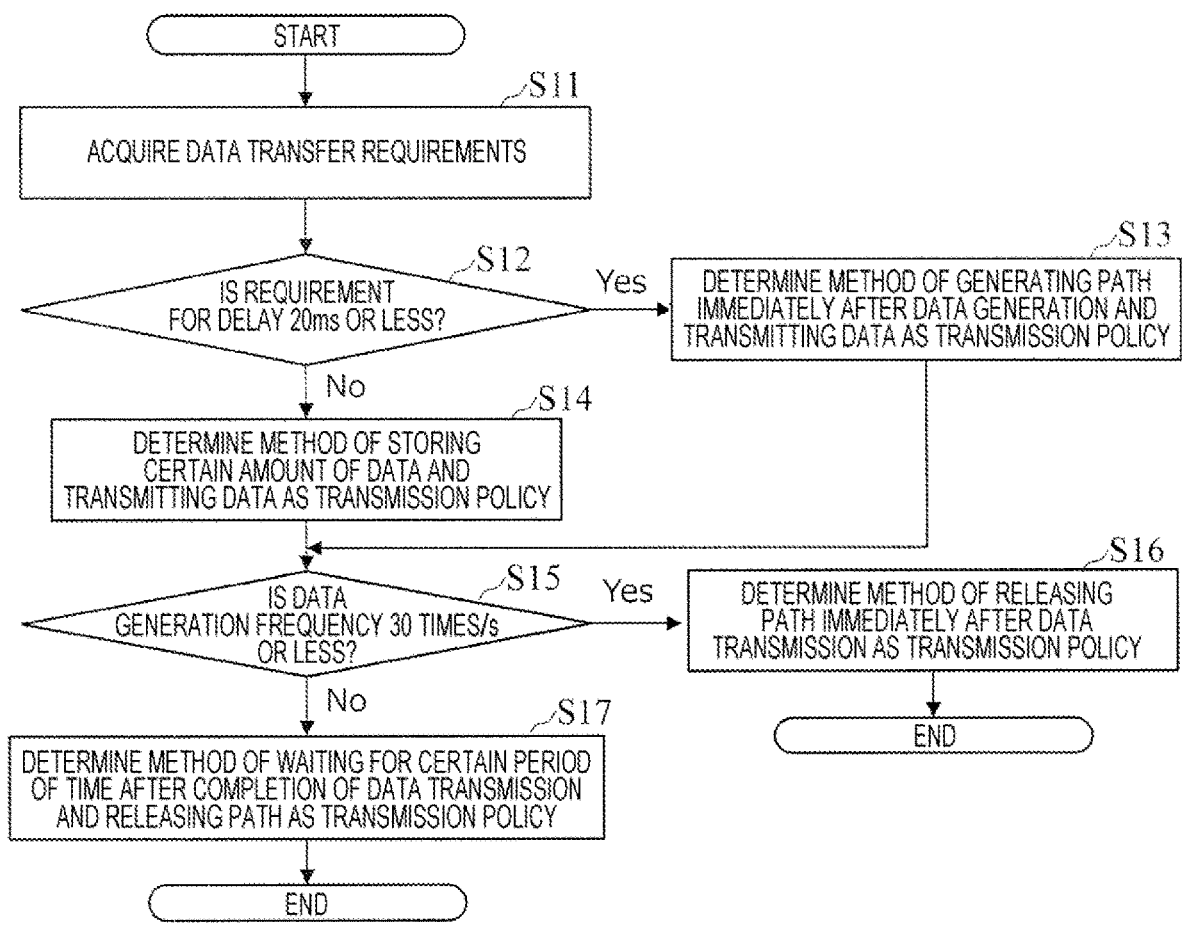
FIG. 8 illustrates an example of an operation in a transmission policy determination function.

FIG. 8 illustrates an example of an operation in the transmission policy determination function 22.

When acquiring data transfer requirements from one of the data sources 10 (S11), the transmission control controller 20 determines a requirement for the allowable delay time (S12). In a case where the requirement for the allowable delay time is 20 ms or less (Yes in S12), a method of generating a path immediately after generation of data and transmitting the data is determined (S13). On the other hand, in a case where the requirement for the allowable delay time exceeds 20 ms (No in S12), a method of storing a certain amount of sensing data and transmitting the sensing data is determined (S14).

Next, the transmission control controller 20 determines the data generation frequency (S15). In a case where the data generation frequency is 30 times/s or less (Yes in S15), a method of releasing a path immediately after data transmission is determined (S16). On the other hand, in a case where the data generation frequency exceeds 30 times/s (No in S15), a method of waiting for a certain period of time after completion of data transmission and releasing a path is determined (S17).

For example, in a case where the set time of the allowable delay times of applications A, B, and C is 20 ms, and the set value of the data generation frequency is 20 times, the transmission control controller 20 determines the transmission policy of the data source 10A as the second transmission policy, determines the transmission policy of the data source 10B as the first transmission policy, and determines the transmission policy of the data source 10C as the third transmission policy.

Here, the data transfer requirements may include application information. In this case, the transmission control controller 20 sets a threshold in consideration of requirements included in the application information in steps S12 and S15.

When receiving the transmission policy from the transmission control controller 20, each of the data sources 10 stores the transmission policy in the transmission policy table 19. As a result, as illustrated in FIG. 9, the transmission policy table 19 of each of the data sources 10 stores the transmission policy suitable for the data source 10.

Figure 10:
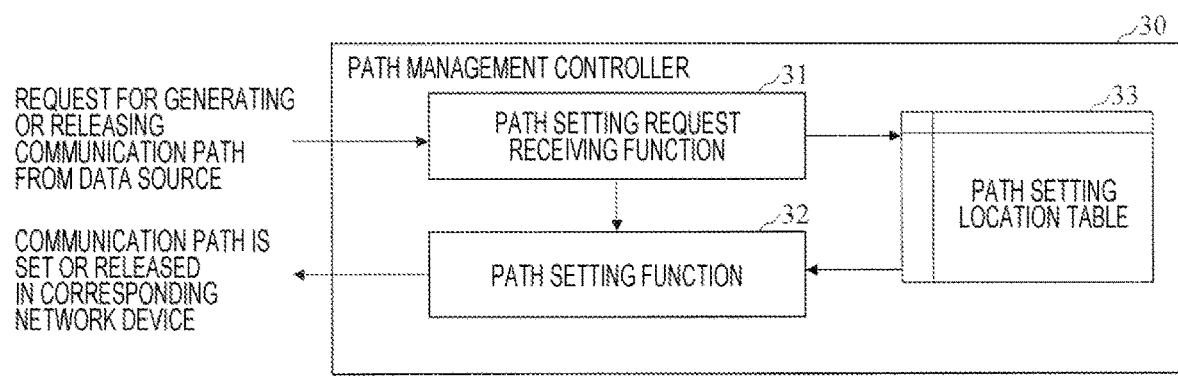
FIG. 10 illustrates a configuration example of a path management controller.

FIG. 10 illustrates a configuration example of the path management controller 30. The path management controller 30 includes a path setting request receiving function 31, a path setting function 32, and a path setting location table 33.

The path setting request receiving function 31 receives a request for generating or releasing a communication path from each of the data sources 10.

The path setting function 32 generates or releases a communication path in accordance with the request for generating or releasing a communication path from each of the data sources 10.

The path setting location table 33 manages setting information (generation/release) of a communication path from each of the data sources 10 to the server 40.

FIG. 11 illustrates an example of the path setting location table 33. The path setting location table 33 stores information on the network devices 81 for transferring sensing data from the data sources 10. For example, in the case of the data source 10A, the information on the network devices 81 includes identification information of the network devices 81A and 81B connecting the data source 10A and the server 40, and setting information (generation/release) of communication paths in the network devices 81A and 81B.

Figure 12:
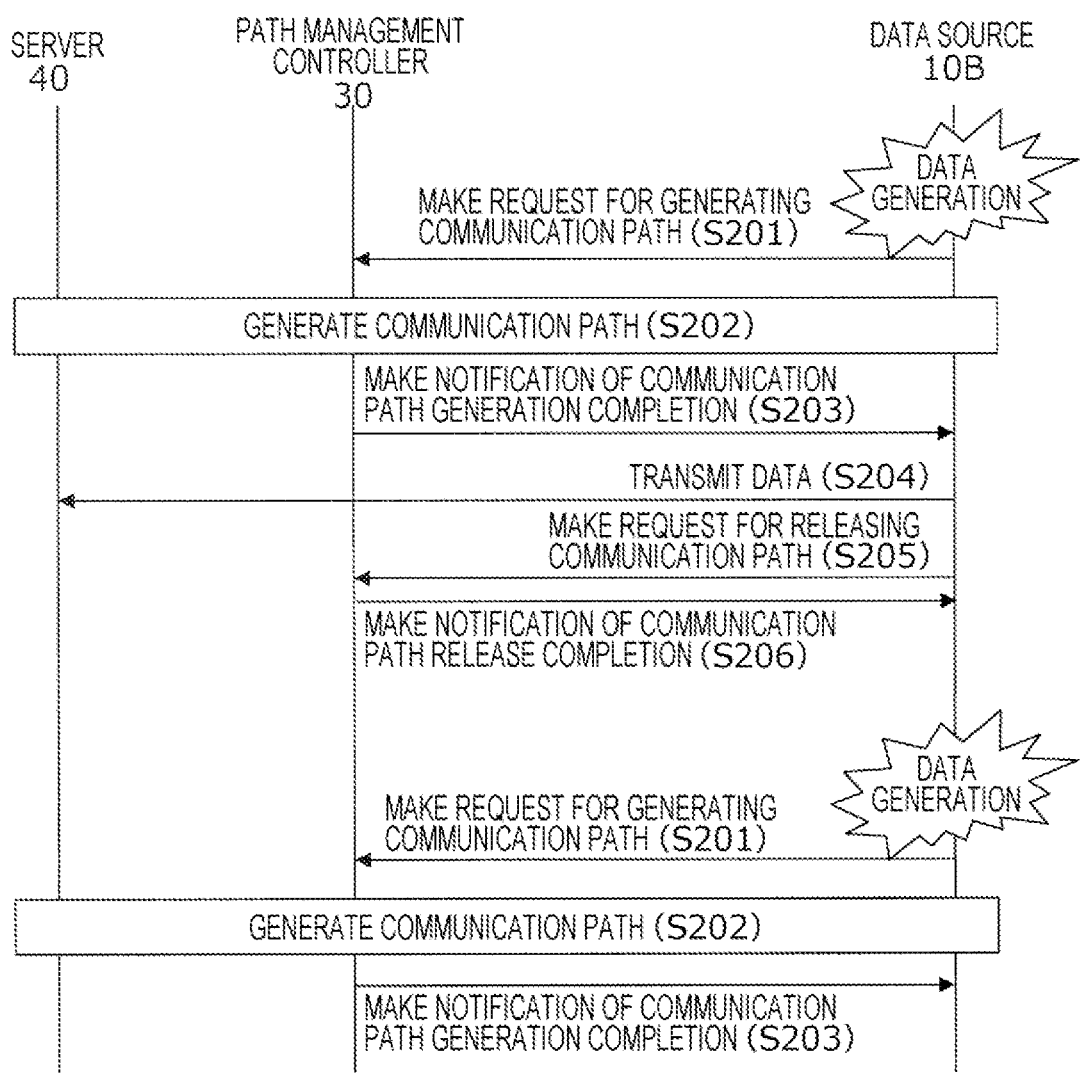
FIG. 12 illustrates an example of an operation in the path management controller.

FIG. 12 illustrates an example of an operation in the path management controller 30. FIG. 12 illustrates a method of generating a path immediately after generation of sensing data and transmitting the sensing data.

When sensing data is generated, the data source 10B transmits a request for generating a communication path to the path management controller 30 (S201).

When receiving the request for generating a communication path, the path management controller 30 sets communication paths of the network devices 81A and 81C and generates the communication paths (S202). When the generation of the communication paths is completed, the path management controller 30 transmits a communication path generation completion notification to the data source 10B (S203).

When receiving the communication path generation completion notification, the data source 10B transmits the sensing data to the server 40 (S204). When the transmission of the sensing data to the server 40 is completed, the data source 10B transmits a request for releasing the communication paths to the path management controller 30 (S205).

When receiving the request for releasing the communication paths, the path management controller 30 releases the communication paths of the network devices 81A and 81C, and transmits a communication path release completion notification indicating that the release of the communication paths is completed to the data source 10B (S206).

Figure 13:
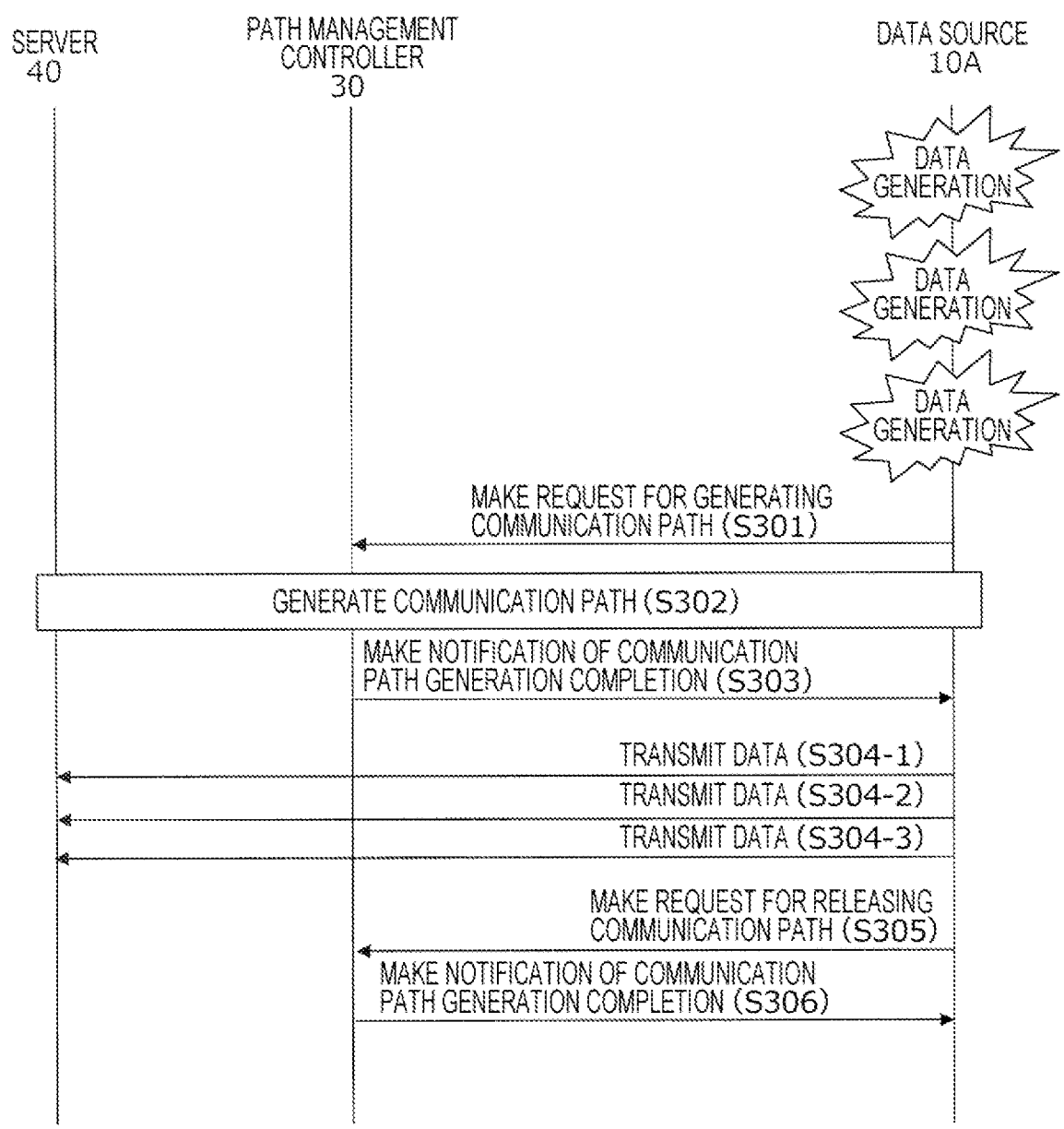
FIG. 13 illustrates an example of an operation in the path management controller.

FIG. 13 illustrates an example of an operation in the path management controller 30. FIG. 13 illustrates a method of storing a certain amount of sensing data and transmitting the sensing data.

In this method, the data source 10A accumulates sensing data generated by a corresponding one of the sensors 50, and transmits a request for generating a communication path to the path management controller 30 when the sensing data reaches a certain amount (S301).

When receiving a communication path generation completion notification (S303), the data source 10A collectively transmits the accumulated sensing data to the server 40 (S304-1, S304-2, S304-3).

Figure 14:
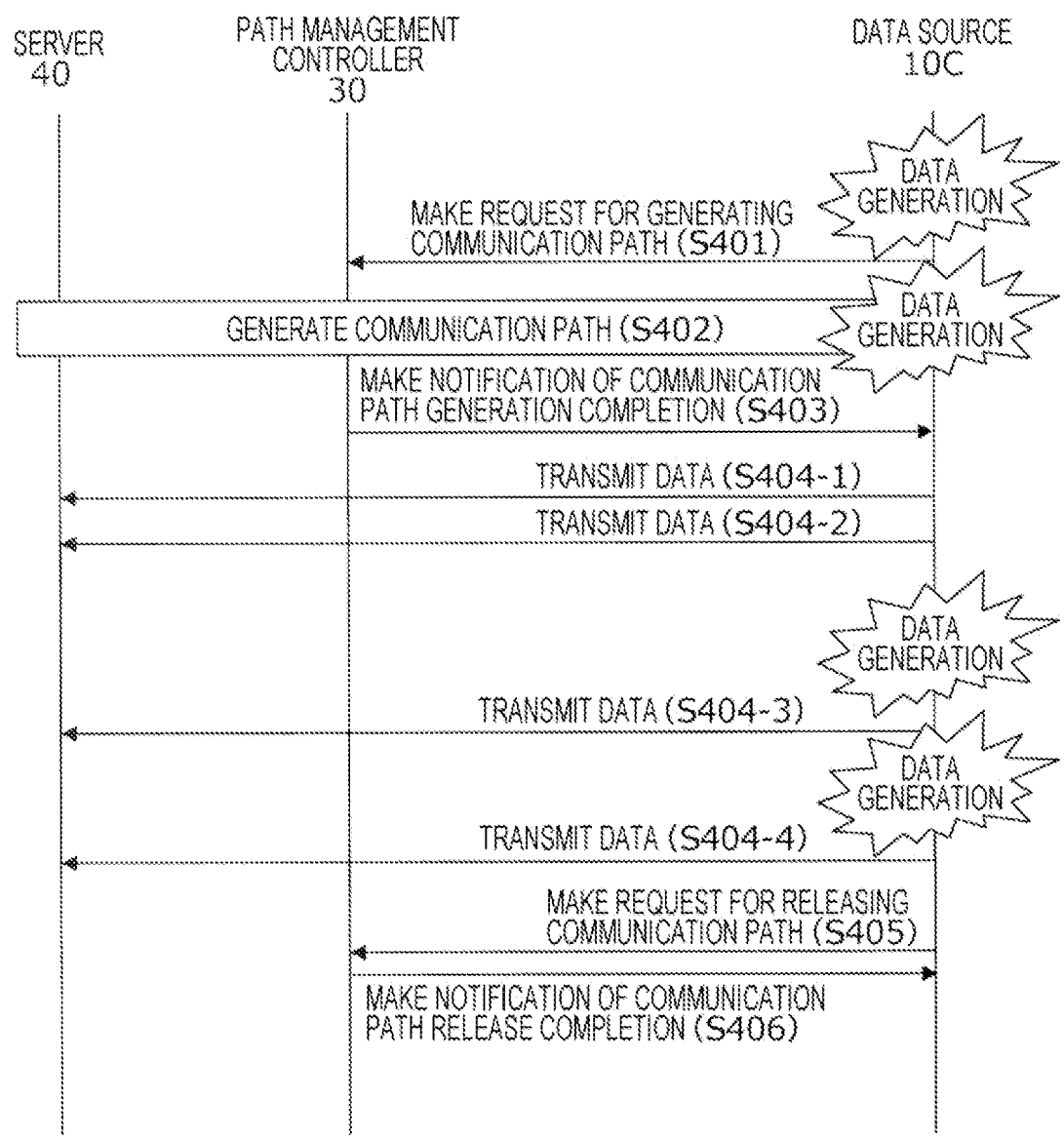
FIG. 14 illustrates an example of an operation in the path management controller.

FIG. 14 illustrates an example of an operation in the path management controller 30. FIG. 14 illustrates a method of holding a path for a certain period of time after transmission.

In this method, when receiving a communication path generation completion notification (S403), the data source 10C transmits sensing data to the server 40 (S404-1, S404-2), and then waits for transmission of a request for releasing a communication path for a certain period of time. When sensing data is generated during that time, the sensing data is transmitted each time the sensing data is generated (S404-3, S404-4).

When a certain period of time has elapsed since the reception of the communication path generation completion notification, the data source 10C transmits the request for releasing the communication path to the path management controller 30 (S405).

As illustrated in FIGS. 12 to 14, in the present embodiment, communication paths are allocated in a time division manner at necessary timings, whereby exhaustion of network resources is prevented, and RDMA communication with a large amount of data sources is implemented. Since the communication paths are allocated only for a necessary period to the data sources 10 from which sensing data is desired to be transmitted, path utilization can be improved, and network resources can be reduced.

Effects of Present Disclosure

As described above, the present disclosure determines a transmission policy for each of the data sources 10 and generates a communication path for each of the data sources 10 in accordance with the transmission policy, so that the communication paths can be assigned in a time-division manner at necessary timings. Therefore, with respect to the trade-off between immediacy of data transmission and reduction in communication path usage time, the present disclosure can perform control to reduce the communication path usage time from each of the data sources 10 to the server 40, facilitate reuse of the communication paths, and reduce the required number of communication paths for the entire communication network 80.

Therefore, the present disclosure can implement the lossless and broadband communication network 80 with the communication paths, and enable RDMA communication with a large number of data sources without requiring a large amount of network resources. Furthermore, the present disclosure can prevent data loss in the communication network 80, and thus data transfer using reliable RDMA can be implemented.

Note that, although an example has been described in which data collected by the server 40 is sensing data in the present embodiment, the present disclosure is applicable to any data required to be collected, such as data in user terminals, sensors, and in-vehicle systems.

Furthermore, in the above-described embodiment, an example has been described in which lossless and broadband communication paths are set between the data sources 10 and the server 40, but the present disclosure is not limited thereto. That is, the path management controller 30 may set a transfer path of data whose quality is not guaranteed as a communication path.

INDUSTRIAL APPLICABILITY

The present disclosure can be applied to the information and communications industry.

REFERENCE SIGNS LIST 10, 10A, 10B, 10C Data source
20 Transmission control controller
30 Path management controller
40 Server
50 Sensor
11 Requirement notification function
12 Transmission policy receiving function
13 Data transmission timing control function
14 Communication path setting function
15 Data transmission function
16 Communication path release function
17 Generated data storage function
18 Requirement table
19 Transmission policy table
21 Requirement receiving function
22 Transmission policy determination function
23 Transmission policy distribution function
24 Transmission policy determination rule
31 Path setting request receiving function
32 Path setting function
33 Path setting location table
41 Data receiving function
42 Memory
43 Application
81A, 81B, 81C, 81D, 81E Network device

The invention claimed is:

1. A computer network system configured to collect data from a plurality of data sources to a server, the computer network system comprising:
    a controller configured to determine transmission policies to be distributed to the plurality of data sources, wherein
    each of the data sources is configured to send, to the controller, data transfer requirements when the data is sent to the server, wherein the data transfer requirements include an allowable delay time and a data generation frequency of each of the data sources,
    the controller is configured to determine a transmission policy of each of the data sources on a basis of the allowable delay time and the data generation frequency of each of the data sources, each of the data sources is configured to autonomously transmit a request for generating a communication path on a basis of the transmission policy, the controller is configured to generate the communication path from each of the data sources to the server on a basis of the request for generating the communication path from each of the data sources, and each of the data sources is configured to transmit data by use of the generated communication path.

2. The computer network system according to claim 1, wherein the transmission policies include:

a transmission policy of generating the communication path immediately after generation of data, transferring the data, and releasing the communication path immediately after completion of the data transfer;

a transmission policy of generating the communication path after a certain amount of data is accumulated, transferring the data, and releasing the communication path immediately after completion of the data transfer; and a transmission policy of generating the communication path immediately after generation of the data, transferring the data, and continuously holding the communication path for a certain period of time after completion of the data transfer.

3. The computer network system according to claim 1, wherein the controller is configured to:

determine a transmission policy of generating the communication path immediately after generation of data, transferring the data, and releasing the communication path immediately after completion of the data transfer in a case where the allowable delay time is equal to or less than a set time and the data generation frequency is equal to or less than a set value, determine a transmission policy of generating the communication path after a certain amount of data is accumulated, transferring the data, and releasing the communication path immediately after completion of the data transfer in a case where the allowable delay time exceeds the set time and the data generation frequency is equal to or less than the set value, and determine a transmission policy of generating the communication path immediately after generation of the data, transferring the data, and continuously holding the communication path for a certain period of time after completion of the data transfer in a case where the allowable delay time is equal to or less than the set time and the data generation frequency exceeds the set value.

4. A method for collecting data from a plurality of data sources to a server, comprising:

sending, by the data sources, data transfer requirements when the data is sent to the server to a controller, wherein the data transfer requirements include an allowable delay time and a data generation frequency of each of the data sources;

determining, by the controller, a transmission policy of each of the data sources on a basis of the allowable delay time and the data generation frequency of each of the data sources;

autonomously transmitting, by each of the data sources, a request for generating a communication path on a basis of the transmission policy;

generating, by the controller, the communication path from each of the data sources to the server on a basis of the request for generating the communication path from each of the data sources; and transmitting, by each of the data sources, data by use of the generated communication path.

5. A non-transitory computer readable medium storing a program, wherein execution of the program causes a computer to be implemented as each functional unit included in the controller according to claim 1.

* * * * *